United States Patent
Nakagawa et al.

(10) Patent No.: US 10,584,645 B2
(45) Date of Patent: Mar. 10, 2020

(54) COMPRESSOR CONTROL DEVICE, COMPRESSOR CONTROL SYSTEM, AND COMPRESSOR CONTROL METHOD

(71) Applicant: MITSUBISHI HEAVY INDUSTRIES COMPRESSOR CORPORATION, Tokyo (JP)

(72) Inventors: Yosuke Nakagawa, Tokyo (JP); Naoto Yonemura, Hiroshima (JP); Kazuhiro Jahami, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 781 days.

(21) Appl. No.: 15/116,294

(22) PCT Filed: Jul. 31, 2014

(86) PCT No.: PCT/JP2014/070161
§ 371 (c)(1),
(2) Date: Aug. 3, 2016

(87) PCT Pub. No.: WO2016/016982
PCT Pub. Date: Feb. 4, 2016

(65) Prior Publication Data
US 2017/0009664 A1    Jan. 12, 2017

(51) Int. Cl.
*F02C 9/28* (2006.01)
*F02C 9/50* (2006.01)
(Continued)

(52) U.S. Cl.
CPC .............. *F02C 9/28* (2013.01); *F02C 3/22* (2013.01); *F02C 6/02* (2013.01); *F02C 7/22* (2013.01);
(Continued)

(58) Field of Classification Search
CPC ...... F02C 9/26; F02C 9/28; F02C 9/30; F02C 9/32; F02C 7/22; F02C 7/236; F02C 9/50;
(Continued)

(56) References Cited

U.S. PATENT DOCUMENTS 6,406,268 B1 * 6/2002 Paice .................. F04D 27/0284
                                                     415/1
6,907,722 B2 * 6/2005 Tanaka ..................... F02C 9/20
                                                     415/27
(Continued)

FOREIGN PATENT DOCUMENTS

JP           9-317498 A    12/1997
JP        2005-76461 A     3/2005
(Continued)

OTHER PUBLICATIONS

International Search Report dated Sep. 16, 2014 in PCT Application No. PCT/JP2014/070161 with English Translation.
(Continued)

*Primary Examiner* — Gerald L Sung
*Assistant Examiner* — Alain Chau
(74) *Attorney, Agent, or Firm* — Birch, Stewart, Kolasch & Birch, LLP

(57) ABSTRACT

With regard to a load running system that comprises a plurality of compressors that compress a fuel gas and supply the compressed fuel gas to a load apparatus, this compressor control device comprises: a feedforward control signal generation unit that, on the basis of a value that is found by dividing the total load of the load apparatus by the number of running compressors, generates a first control signal that is for controlling the amount of fuel gas supplied by the compressors; and a control unit that, on the basis of the first control signal, controls the amount of fuel gas supplied by the compressors.

14 Claims, 8 Drawing Sheets

(51) Int. Cl.
*F02C 9/26* (2006.01)
*F02C 7/36* (2006.01)
*F02C 3/22* (2006.01)
*F02C 7/22* (2006.01)
*F02C 6/02* (2006.01)
*F02C 9/30* (2006.01)
*F02C 7/236* (2006.01)

(52) U.S. Cl.
CPC ............... *F02C 7/236* (2013.01); *F02C 7/36* (2013.01); *F02C 9/26* (2013.01); *F02C 9/30* (2013.01); *F02C 9/50* (2013.01); *F05D 2220/32* (2013.01); *F05D 2270/301* (2013.01)

(58) Field of Classification Search
CPC ........ F02C 7/36; F02C 6/02; F05D 2270/301; F05D 2270/3013; F05D 2220/32
See application file for complete search history.

(56) References Cited

U.S. PATENT DOCUMENTS

| | | | | |
|---|---|---|---|---|
| 7,184,875 B2* | 2/2007 | Ferrall | ............... | H01M 8/04373 429/413 |
| 7,556,473 B2* | 7/2009 | Takeshita | ................ | F02C 7/236 415/151 |
| 7,752,833 B2* | 7/2010 | Feiz | ........................ | F02C 3/22 60/39.281 |
| 2006/0101824 A1* | 5/2006 | Takeda | .................... | F04D 27/02 60/727 |
| 2006/0248894 A1* | 11/2006 | Hiramoto | .................. | F02C 3/22 60/772 |
| 2007/0110587 A1* | 5/2007 | Takeshita | ................ | F02C 7/236 417/26 |
| 2007/0245707 A1* | 10/2007 | Pashley | ..................... | F02C 9/26 60/39.27 |
| 2013/0180250 A1* | 7/2013 | Harada | .................. | F02C 7/232 60/740 |
| 2014/0230449 A1* | 8/2014 | Saito | ........................ | F02C 7/22 60/776 |
| 2016/0341131 A1* | 11/2016 | Nakagawa | ............... | F02C 9/46 |
| 2017/0044997 A1* | 2/2017 | Nakagawa | ............... | F02C 7/22 |

FOREIGN PATENT DOCUMENTS

| | | |
|---|---|---|
| JP | 4191563 B2 | 12/2008 |
| WO | WO 02/02920 A1 | 1/2002 |

OTHER PUBLICATIONS

Written Opinion dated Sep. 16, 2014 in PCT Application No. PCT/JP2014/070161 with English Translation.
Search Report dated Feb. 24, 2017 in counterpart EP Application No. 14898366.1.

* cited by examiner

COMPRESSOR CONTROL DEVICE, COMPRESSOR CONTROL SYSTEM, AND COMPRESSOR CONTROL METHOD

TECHNICAL FIELD

The present invention relates to a compressor control device, a compressor control system, and a compressor control method.

BACKGROUND ART

A fuel gas compressor for supplying a fuel gas to a gas turbine is controlled such that a pressure of a fuel gas header is constant. For example, by combining a feedforward control which uses a preceding signal on the basis of a load of the gas turbine and a feedback control on the basis of a measured value and a target value of the pressure of the fuel gas header, a supply amount of the fuel gas discharged from the compressor is adjusted, and the pressure of the fuel gas header is controlled. As means for adjusting the supply amount of the fuel gas, an Inlet Guide Vane (IGV) provided on the upstream side of a compressor, or an Anti Surge Valve (ASV) which is provided on a bypass through which the fuel gas discharged from the compressor is recirculated to the upstream side is used. A control system of the fuel gas compressor adjusts the opening degree via the feedforward control and the feedback control, and controls the pressure of the fuel gas header.

However, in the case of a system in which a plurality of gas turbines and a plurality of fuel gas compressors are provided, when the pressure of the fuel gas header is controlled, there is a problem of how a load of each compressor is determined. For example, a method may be considered, in which each gas turbine and each compressor are associated with each other in a one-to-one correspondence, and a load corresponding to the load of the gas turbine associated with each compressor is assigned to each compressor. In addition, a method which equally assigns a load to each compressor with respect to a total load of the gas turbine may be considered (for example, PTL 1).

CITATION LIST

Patent Literature

[PTL 1] Japanese Unexamined Patent Application Publication No. 09-317498

SUMMARY OF INVENTION

Technical Problem

However, in the method in which each gas turbine and each compressor are associated with each other in a one-to-one correspondence, as described in PTL 1, the efficiency of the compressor may deteriorate in a situation in which the gas turbine is operated in a partially loaded state, or there may be a problem that insufficient fuel gas is supplied to the gas turbine in a situation in which a plurality of compressors are abnormally stopped. In addition, in the method which equally assigns a load to each compressor to control the compressors, PTL 1 discloses that it is possible to solve the problem of the method in which each compressor and each gas turbine are associated with each other in a one-to-one correspondence by equally assigning a load to each compressor to operate the compressors. However, a specific control method is not disclosed in PTL 1, and in the method of PTL 1, it is assumed that the number of compressors is greater than the number of gas turbines. Accordingly, in the system in which a plurality of gas turbines and a plurality of fuel gas compressors are provided, a load control method of each compressor is required, which can be used in a state the number of gas turbines or compressors is not limited.

Accordingly, an object of the present invention is to provide a compressor control device, a compressor control system, and a compressor control method capable of solving the above-described problems.

Solution to Problem

According to a first aspect of the present invention, there is provided a load running system which includes a plurality of compressors which compress a fuel gas and supply the compressed fuel gas to a load apparatus, in which a compressor control device includes: a feedforward control signal generation unit which generates a first control signal which controls an amount of the fuel gas supplied by the compressors, on the basis of a value which is obtained by dividing the total load of the load apparatus by the number of running compressors; and a control unit which controls the amount of the fuel gas supplied by the compressors, on the basis of the first control signal.

According to a second aspect of the present invention, the above-described compressor control device further includes a feedback control signal generation unit which performs a feedback control, on the basis of a deviation between a target value and a measured value of a header pressure of the fuel gas, and generates a second control signal, in which the control unit controls the supply amount of the fuel gas, on the basis of a value which is obtained by adding the second control signal to the first control signal.

According to a third aspect of the present invention, in the above-described compressor control device, the feedback control signal generation unit generates a new second control signal which has a calculated value obtained by dividing the value of the generated second control signal by the number of running compressors as a value.

According to a fourth aspect of the present invention, the above-described compressor control device further includes a process value selection unit which acquires a measured value of a discharge pressure of at least one compressor and a measured value of the head pressure of the fuel gas, and selects the smaller value of the maximum value of the measured values of the discharge pressure of the compressor and the measured value of the header pressure of the fuel gas, in which the feedback control signal generation unit performs a feedback control, on the basis of a deviation between the target value of the header pressure and the value selected by the process value selection unit, and generates the second control signal.

According to a fifth aspect of the present invention, in the above-described compressor control device, the control unit controls the supply amount of the fuel gas by adjusting an opening degree of any one of a flow rate regulation valve which controls the amount of the fuel gas flowing into the compressors and a recycle valve for returning the fuel gas discharged from the compressors to the upstream sides of the compressors.

According to a sixth aspect of the present invention, the above-described compressor control device further includes a running number determination unit which determines the number of running compressors according to the total load of the load apparatus.

According to a seventh aspect of the present invention, in the above-described compressor control device, in a case where the total load of the load apparatus varies by as much as or by more than a predetermined range within a predetermined time, the running number determination unit does not change the number of running compressors until a predetermined time has elapsed after the variation.

According to an eighth aspect, there is provided a load running system, including: a plurality of compressors; one compressor control device according to any one of the first to seventh aspects which controls the plurality of compressors; and a load apparatus to which the plurality of compressors supply the fuel gas.

According to a ninth aspect of the present invention, there is provided a load running system, including: a plurality of compressors; one compressor control device according to any one of the first to seventh aspects which is provided to each of the plurality of compressors; and a load apparatus to which the plurality of compressors supply the fuel gas.

According to a tenth aspect of the present invention, the load running system according to the eighth or ninth aspect includes the compressor control device according to any one of the second to seventh aspects, in which, in the controls of all compressors controlled by the compressor control device, the compressor control device controls the supply amount of the fuel gas, on the basis of a value obtained by adding the second control signal to the first control signal.

According to an eleventh aspect of the present invention, the load running system according to the eighth or ninth aspect includes the compressor control device according to any one of the second to seventh aspects, in the controls of some compressors among the compressors controlled by the compressor control device, the compressor control device controls the supply amount of the fuel gas, on the basis of a value obtained by adding the second control signal to the first control signal, and in the controls of the remaining compressors, the compressor control device controls the supply amount of the fuel gas, on the basis of only the first control signal.

According to a twelfth aspect of the present invention, there is provided a method of controlling a compressor control device in a load running system including a plurality of compressors which compress a fuel gas and supply the compressed fuel gas to a load apparatus, including: generating a first control signal which controls an amount of the fuel gas supplied by the compressors, on the basis of a value which is obtained by dividing the total load of the load apparatus by the number of running compressors; and controlling the amount of the fuel gas supplied by the compressors, on the basis of the first control signal.

Advantageous Effects of Invention

According to the above-described aspects of the present invention, in a system in which a plurality of gas turbines and a plurality of fuel gas compressors are provided, it is possible to assign loads to the compressors regardless of the numbers of gas turbines and compressors.

DESCRIPTION OF EMBODIMENTS

First Embodiment

Hereinafter, a compressor control device according to a first embodiment of the present invention is described with reference to FIGS. 1 to 4.

Figure 1:
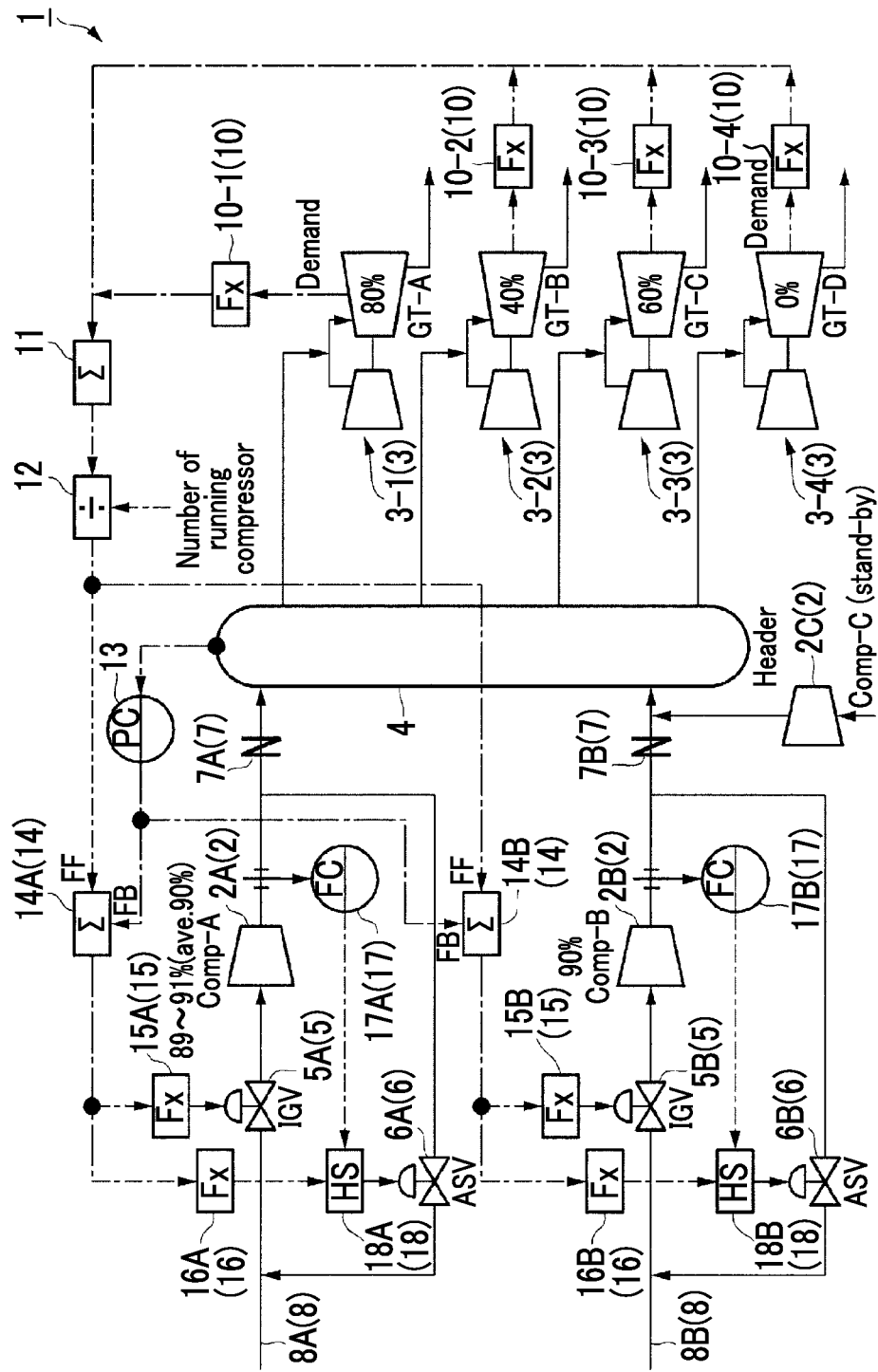
FIG. 1 is a first diagram showing an example of a configuration of a load running system in a first embodiment of the present invention.

FIG. 1 is a first diagram showing an example of a configuration of a load running system according to the first embodiment of the present invention. A load running system 1 includes a plurality of compressors 2 (2A, 2B, and 2C), a plurality of gas turbines 3 (3-1, 3-2, 3-3, and 3-4), and a compressor control device 30. The number of running gas turbines 3 may be one or a multiple. In the load running system 1 of FIG. 1, three compressors 2 (2A, 2B, and 2C), four gas turbines 3 (3-1, 3-2, 3-3, and 3-4), and one compressor control device 30 are provided. In addition, the compressor 2C is a spare compressor which is not run currently. A fuel gas which is a fuel of the gas turbine 3 is supplied from the upstream side of a fuel gas supply line 8 (8A and 8B), and is supplied to the gas turbine 3 (3-1 to 3-4) via an IGV 5 (5A and 5B), the compressor 2 (2A and 2B), a check valve 7 (7A and 7B), and a fuel gas header 4 in this order from the upstream side in a flow direction of the fuel gas. In addition, the compressors 2A and 2B may be collectively referred to the compressor 2, and the gas turbines 3-1 to 3-4 may be collectively referred to the gas turbine 3. This is similarly applied to the IGV 5 or the like.

The IGV 5 is provided on the upstream side of the compressor 2, and adjusts the amount of the fuel gas which flows into the compressor 2. The compressor 2 compresses the fuel gas supplied via the fuel gas supply line 8, and discharges the compressed fuel gas to the downstream side. In addition, a bypass through which the fuel gas is recirculated from the downstream side of the compressor 2 to the upstream side of the compressor 2 is provided in the fuel gas supply line 8, and an ASV 6 (6A and 6B) is provided in the bypass. The ASV 6 is a recycle valve for adjusting a flow rate of the fuel gas returned to the upstream side of the compressor 2 in the fuel gas discharged from the compressor 2.

The fuel gas header 4 is a space for controlling a header pressure of the fuel gas supplied to the gas turbine 3. The fuel gas header 4 may be a container or a pipe for buffering variation in the pressure of the fuel gas. The compressor control device 30 controls the flow rate of the fuel gas discharged from the compressor 2 to constantly maintain the pressure of the fuel gas header 4 such that the amount of the fuel gas supplied to the gas turbine 3 does not vary.

The compressor control device 30 is configured to include a function generator 10 (10-1, 10-2, 10-3, and 10-4), an adder 11, a divider 12, a Pressure Controller (PC) 13, an adder 14 (14A and 14B), a function generator 15 (15A and 15B), a function generator 16 (16A and 16B), a Flow Controller (FC) 17 (17A and 17B), and a high-level selector 18 (18A and 18B). In addition, the function generators 10-1 to 10-4 are collectively referred to as the function generator 10, and the adders 14A and 14B are collectively referred to as the adder 14. This is similarly applied to another function generator 15 or the like.

The function generator 10 acquires an output command value, which is corresponding to the load of the gas turbine 3, from a gas turbine output control device (not shown) or the like, and calculates an operation value corresponding to the output command value according to the acquired gas turbine load, on the basis of a correspondence table between the gas turbine load and the operation value, or the like. The function generator 10 outputs the calculated operation value to the adder 11. Hereinafter, the output command value corresponding to the gas turbine load is referred to as a preceding signal of the gas turbine load.

The adder 11 acquires an operation value from each of the function generators 10-1 to 10-4, and adds up the acquired operation values. The adder 11 outputs the value obtained by adding up the operation values to the divider 12.

The divider 12 divides the total value of the operation values acquired from the adder 11 corresponding to the load of the gas turbine 3 by the number of running compressors 2. The divider 12 outputs the divided value to the adder 14. In addition, the number of the running compressors 2 can be recognized by the compressor control device 30.

In the case of FIG. 1, the load of the gas turbine 3-1 is 80%, the load of the gas turbine 3-2 is 40%, the load of the gas turbine 3-3 is 60%, and the load of the gas turbine 3-4 is 0%. The operation values calculated by the function generators 10-1, 10-2, 10-3, and 10-4 corresponding to the gas turbine loads respectively are 80%, 40%, 60%, and 0%. In this case, the adder 11 adds up the operation values, and calculates 180% (80+40+60+0=180%). In addition, the divider 12 divides 180 by the running number of 2 and calculates 90%.

In addition, in a case where the operation value obtained by the divider 12 exceeds an upper limit (for example, 100%), the divider 12 outputs the upper limit (100%) to the adder 14. Moreover, at this time, the compressor control device 30 outputs an instruction signal to a gas turbine output control device (not shown) or the like so as to decrease an overload of the gas turbine load such that the operation value calculated by the divider 12 does not exceed the upper limit.

The PC 13 calculates deviation between a measured value of the fuel gas pressure in the fuel gas header 4 and a target value of the fuel gas pressure in the fuel gas header 4, performs a feedback control such that the measured value of the fuel gas pressure in the fuel gas header 4 approaches the target value, and generates a feedback control signal. The value of the feedback control signal is equivalent to a correction amount which corrects a current operation value. The PC 13 outputs the correction amount of the operation value based on the fuel gas header pressure to the adders 14A and 14B. In addition, the PC 13 may output the correction amount of the calculated operation value to only a portion (for example, only the adder 14A) of the plurality of adders 14. In addition, the target vale of the fuel gas header pressure is stored in the PC 13 in advance. Moreover, the measured value of the fuel gas pressure is measured by a pressure gauge (not shown) which is provided in the fuel gas header 4.

The adder 14 adds up the operation value obtained by the divider 12 and the correction amount of the operation vale acquired by the PC 13, and outputs the added value to the function generator 15 and the function generator 16. In a case where the PC 13 outputs the correction amount of the operation value to only a portion of the adders 14, the adder 14 (for example, adder 14B) which does not acquire the correction amount outputs the operation value acquired by the divider 12 to the function generator 15 and the function generator 16. The operation value output by the adder 14 is a value which becomes an origin of a control signal indicated to each operation end of the compressor 2. The operation end is a device which controls a rotating speed of the compressor 2 or a device which controls an opening degree of the IGV 5 or the ASV 6. In addition, the operation value output by the adder 14 is a value indicating a load assigned to each compressor 2. Each operation end adjusts the IGV opening degree on the basis of the operation value output by the adder 14, and thus, the load allocated to each compressor 2 is controlled.

The function generator 15 acquires the operation value from the adder 14, and calculates the IGV opening degree corresponding to the acquired operation value on the basis of a correspondence table between the operation value and the IGV opening degree or the like. The function generator 15 outputs a command signal which becomes the calculated IGV opening degree to the IGV 5.

The function generator 16 acquires the operation value from the adder 14, and calculates the ASV opening degree corresponding to the acquired operation value on the basis of a correspondence table between the operation value and the ASV opening degree or the like. The function generator 16 outputs the signal corresponding to the calculated ASV opening degree to the high-level selector 18.

The FC 17 calculates deviation between a measured value of a flow rate of the fuel gas discharged from the compressor 2 and a target value of the flow rate of the fuel gas, calculates an operation amount on the basis of the deviation, and outputs a signal corresponding to the operation amount to the high-level selector 18. In addition, for example, the target value of the flow rate of the fuel gas is a value based on the IGV opening degree calculated by the function generator 15.

The high-level selector 18 compares the signal obtained from the function generator 16 with the signal obtained from the FC 17, selects the signal having a larger value of the two signals, and outputs the selected signal to the ASV 6 as an ASV opening degree command signal.

Since the compressor control device 30 outputs the command signal based on the operation value with respect to each operation end, the compressor control device 30 assigns the load allocated to each compressor 2. For example, in a case where the PC 13 outputs the correction amount calculated by the feedback control to only the adder 14A by the load control with respect to the compressor 2, in addition, in a case where the operation value corresponding to the preceding signal of the gas turbine load is 90%, as shown in FIG. 1, the load of the compressor 2A is 89% to 91%, and the load of the compressor 2B is 90%. The variation in the load of the compressor 2A occurs due to influences of the feedback control. In addition, as described above, the correction amount calculated by the feedback control of the PC 13 may be output to all adders 14 of the compressor 2, or may be output to only a portion of the all adders 14. For example, in a case where the feedback control signal is output to the plurality of adders 14, the plurality of controls interfere with each other, and a long period of time is required to statically determine the fuel gas header pressure, or the like, the feedback control signal may be output to only one adder 14.

In this way, according to the present embodiment, in the case where the plurality of compressors 2 for supplying the fuel gas to the gas turbine are provided, it is possible to obtain the load assigned to the compressor 2 according to the gas turbine load. Since the method of the present embodiment is performed on the basis of the total load of the gas turbines and the number of the running compressors 2, the method may be applied regardless of the numbers of the gas turbines 3 and the compressors 2 or the changes thereof. For example, the number of the running gas turbines 3 may be smaller than the number of the running compressors 2, and as shown in FIG. 1, the number of the running gas turbines 3 may be larger than the number of the running compressor 2. For example, if the total load value is not changed even when the number of the running gas turbines 3 is change, the compressor 2 side is not influenced.

In addition, since the preceding signals of the loads with respect to the plurality of compressors 2 are generated by the feedforward control based on the preceding signals of the gas turbine load, even in a situation in which the total load value of the gas turbines 3 varies, it is possible to quickly cope with the variation.

In addition, since the operation value is obtained on the basis of the value which is obtained by dividing the total load value of the gas turbines by the number of the running compressors 2 and the operation value is output to each compressor 2, even when a slightly difference occurs due to the feedback control, it is possible to substantially equally assign the load to each compressor 2. Accordingly, it is possible to operate the plurality of compressors 2 without decreasing efficiency.

In FIG. 1, the plurality of compressors 2 are controlled by one compressor control device 30. In the case of this configuration, in a case where a load of processing is concentrated to one compressor control device 30 or maintenance of the compressor control device 30 is required, a situation in which all the compressors 2 should be stopped may occur. In addition, in a case where a control is performed by one compressor control device 30, a configuration for operating this device by a master controller is required, and in general, the configuration of the control system is easily complicated. Accordingly, as shown in FIG. 2, by providing the compressor control device 30 of the present embodiment for each compressor, it is possible to simplify the control system.

Figure 2:
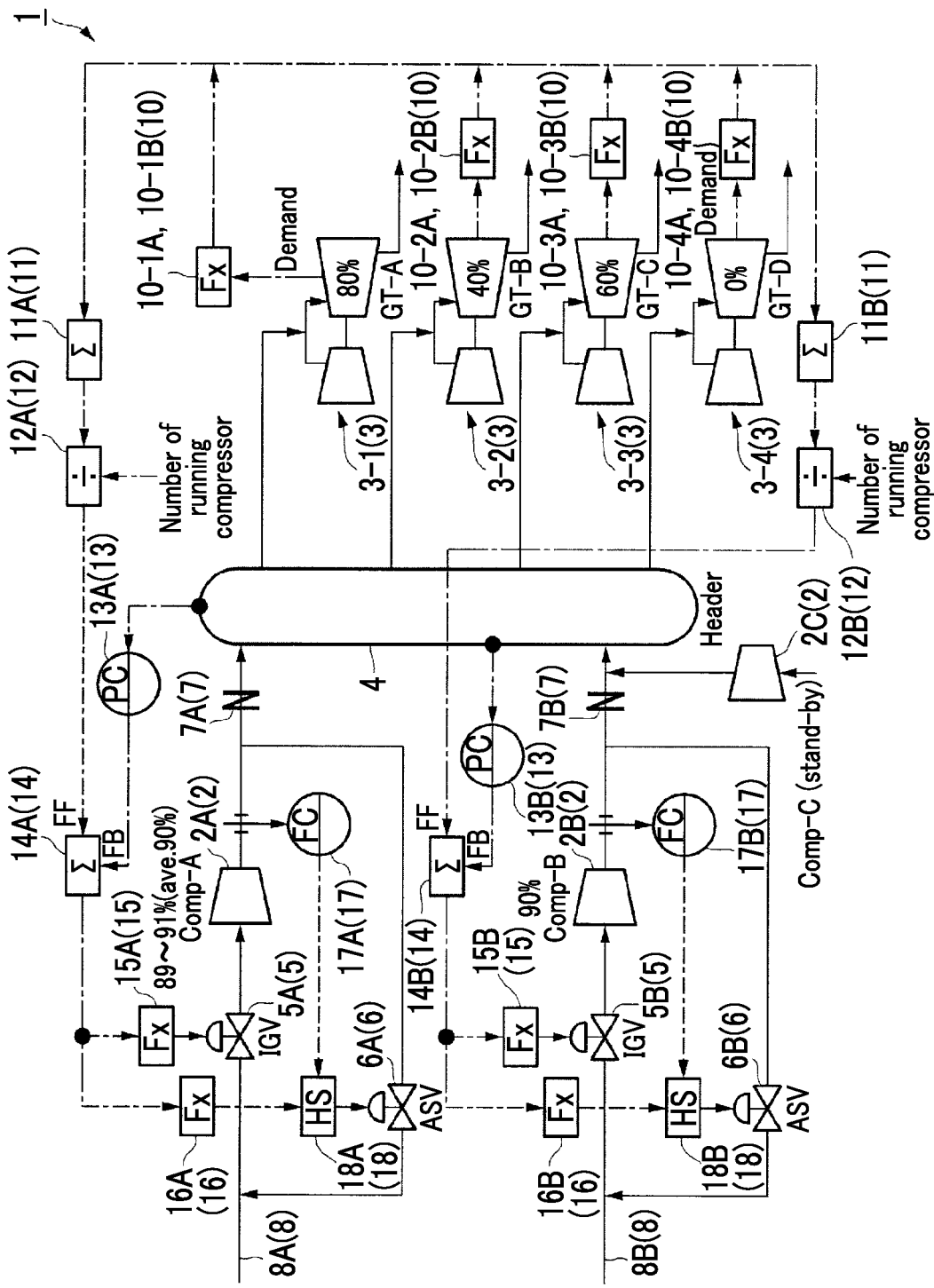
FIG. 2 is a second diagram showing an example of the configuration of the load running system in the first embodiment of the present invention.

FIG. 2 is a second diagram showing an example of the configuration of the load running system in the first embodiment of the present invention. An example of the configuration of the load running system when the compressor control device 30 of the present embodiment is provided for each compressor is described with reference to FIG. 2.

In the case of FIG. 2, two compressor control devices 30 (30A and 30B) (not shown) are provided in the load running system 1. The compressor control device 30A controls the compressor 2A. The compressor control device 30B controls the compressor 2B.

The compressor control device 30A is configured to include a function generator 10A (10-1A, 10-2A, 10-3A, and 10-4A), an adder 11A, a divider 12A, a PC 13A, an adder 14A, a function generator 15A, a function generator 16A, a FC 17A, and a high-level selector 18A. Meanwhile, the compressor control device 30B is configured to include a function generator 10B (10-1B, 10-2B, 10-3B, and 10-4B), an adder 11B, a divider 12B, a PC 13B, an adder 14B, a function generator 15B, a function generator 16B, a FC 17B, and a high-level selector 18B.

Differences between FIG. 1 and FIG. 2 are described. In the case of the configuration of FIG. 2, each of the compressor control devices 30A and 30B includes the function generator 10, the adder 11, and the divider 12, and the preceding signal of the gas turbine load is input to each of the compressor control devices 30A and 30B. In addition, the function generator 10 in each of the compressor control devices 30A and 30B calculates the operation value on the basis of the gas turbine load, and adds up operations values calculated by the adder 11. In addition, for example, information of whether or not the compressor 2 controlled by the compressor control devices 30A and 30B is run is informed to each other by communication means, the number of the running compressors 2 used in the division of the divider 12 is obtained by counting the number of the running compressors, and the divider 12 divides the operation value by the obtained running number. In addition, each of the compressor control device 30A and 30B includes the PC 13, and the PC 13 performs the feedback control on the basis of the fuel gas header pressure and calculates the correction amount. In addition, each of the compressor control devices 30A and 30B includes the adder 14, and the adder 14 adds up the operation value acquired from the divider 12 included in the device and the correction amount of the operation value acquired from the PC 13 included in the device and outputs the added value to the function generators 15 and 16.

In addition, the calculation of the correction amount using the PC 13 and the output with respect to the adder 14 may be performed by both of the compressor control devices 30A and 30B, and may be performed by any one of the compressor control devices 30A and 30B.

According to this configuration, it is possible to simplify the control system of the load running system 1.

Figure 3:
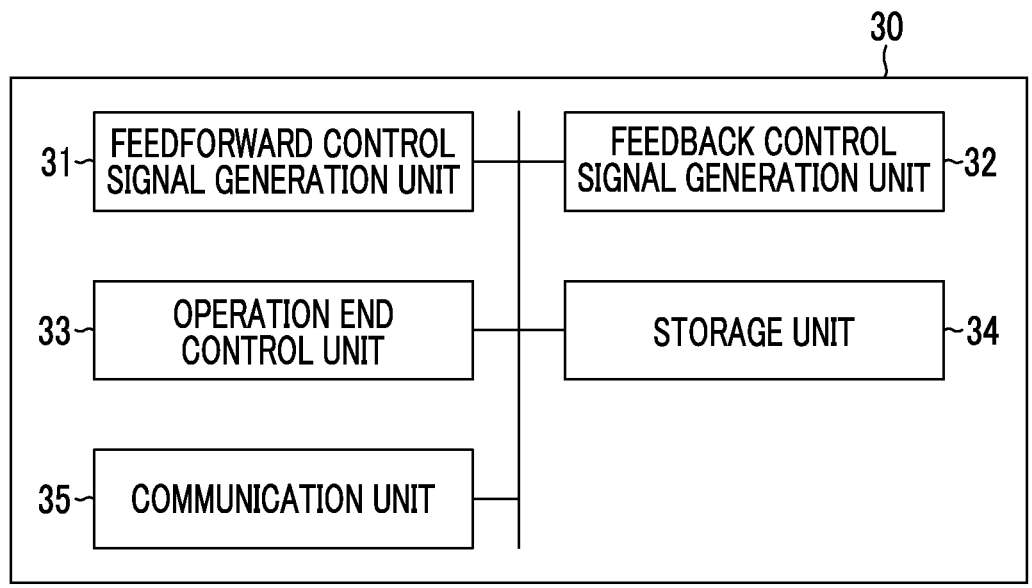
FIG. 3 is a block diagram showing an example of a compressor control device in the first embodiment of the present invention.

FIG. 3 is a block diagram showing an example of the compressor control device in the first embodiment of the present invention.

The configuration of the compressor control device 30 is described with reference to FIG. 3.

With respect to at least one of the plurality of compressors 2, a feedforward control signal generation unit (hereinafter, refer to FF control signal generation unit) 31 generates a first control signal for controlling the amount of the fuel gas supplied by the compressor 2, on the basis of the value which is obtained by dividing the total load of the load apparatus (gas turbine 3) by the number of the running compressors 2. In the example of FIGS. 1 and 2, the FF control signal generation unit 31 includes the function generator 10, the adder 11, and the divider 12.

A feedback control signal generation unit (hereinafter, referred to as a FB control signal generation unit) 32 performs the feedback control on the basis of the deviation between the target value of the fuel gas header pressure and the measured value of the fuel gas header pressure, and generates a second control signal (feedback control signal). In the examples of FIGS. 1 and 2, the FB control signal generation unit 32 includes the PC 13.

An operation end control unit 33 controls the amount of the fuel gas supplied by the compressor 2 on the basis of the first control signal or a value which is obtained by adding the second control signal to the first control signal. The operation end control unit 33 maintains the fuel gas header pressure to a predetermined value by regulating the supply amount of the fuel gas. In the examples of FIGS. 1 and 2, the operation end control unit 33 includes the adder 14, the function generator 15, the function generators 16, the FC 17, and the high-level selector 18. Moreover, in the examples of FIGS. 1 and 2, the operation end control unit 33 controls the opening degrees of the IGV 5 and the ASV 6. However, the operation end control unit 33 may control the supply amount of the fuel gas by changing the rotating speed of the compressor 2.

A storage unit 34 stores functions required for controlling the load of the compressor such as the correspondence table between the gas turbine load and the operation value or the correspondence table between the operation value and the IGV opening degree, a target value required for the feedback control, or the like.

A communication unit 35 transmits and receives the control signal with other control devices. For example, the communication unit 35 receives the preceding signal of the gas turbine load from the gas turbine output control device, and outputs the preceding signal to the FF control signal generation unit 31. In addition, in a case where the load of the compressor 2 exceeds the upper limit, the communication unit 35 transmits the command signal which decreases the output of the gas turbine to the gas turbine output control device. In addition, in a case where all compressors 2 are not controlled by one compressor control device 30 and each compressor control device 30 controls one compressor 2 as shown in FIG. 2, information of whether or not the compressors 2 are run communicates with each other via the communication unit 35.

Figure 4:
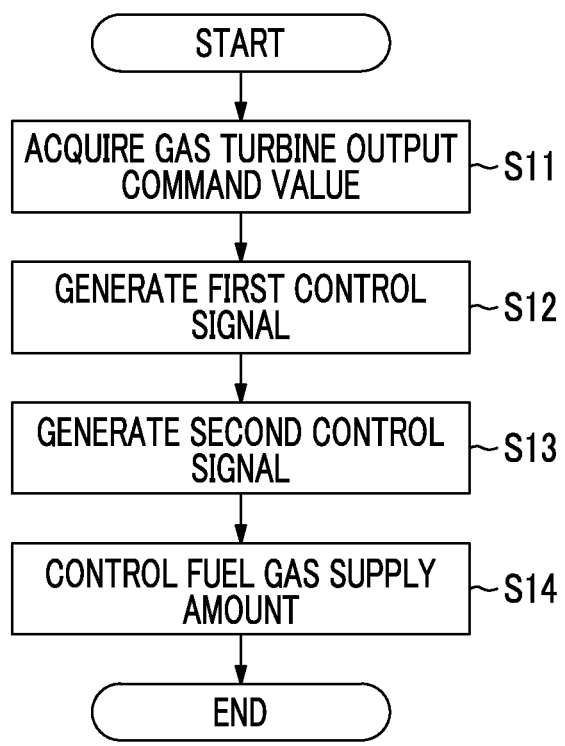
FIG. 4 is a flowchart of load control processing of a compressor in the first embodiment of the present invention.

FIG. 4 is a flowchart of F of the load control processing of the compressor in the first embodiment of the present invention. The flow in the processing of the compressor control device 30 is described while comparing with the configuration exemplified in FIG. 1. In addition, the PC 13 outputs the correction amount (second control signal) of the operation value, which is calculated by the feedback control on the basis of the fuel gas header pressure, to the adder 14A, and does not output the correction amount to the adder 14B.

First, the FF control signal generation unit 31 acquires the preceding signal of the gas turbine load with respect to each gas turbine 3 of the load running system 1 via the communication unit 35 (Step S11). Subsequently, the FF control signal generation unit 31 calculates the operation value corresponding to the acquired gas turbine load with reference to the correspondence table between the gas turbine load stored in the storage unit 34 in advance and the operation value. This is processing of the function generator 10 included in the FF control signal generation unit 31. If the operation value corresponding to the gas turbine load for each gas turbine is calculated, the FF control signal generation unit 31 adds up the operation values. This is processing performed by the adder 11 included in the FF control signal generation unit 31. Subsequently, the FF control signal generation unit 31 counts the number of the compressors 2 which is currently run, divides the summed value of the operation values by the number of the running compressors 2, and generates the first control signal corresponding to the value obtained by the division (Step S12). This is processing performed by the divider 12 included in the FF control signal generation unit 31. The FF control signal generation unit 31 outputs the generated first control signal to the operation end control unit 33. The first control signal is a signal corresponding to the preceding signal of the gas turbine load, and an operation with respect to the operation end of the compressor 2 based on the first control signal is the feedforward control corresponding to the gas turbine load. In addition, the first control signal indicates a load assigned to one compressor.

In addition, in parallel with Steps S11 and S12, the FB control signal generation unit 32 reads the target value of the fuel gas header pressure from the storage unit 34. In addition, the FB control signal generation unit 32 acquires the measured value of the fuel gas header pressure which is measured by the pressure gauge provided in the fuel gas header 4, and obtains the deviation between the target value and the measured value of the fuel gas header pressure. Subsequently, the FB control signal generation unit 32 performs the feedback control such as Proportional Integral (PI) on the basis of the obtained deviation, and generates the second control signal for allowing the measure value of the fuel gas header pressure to approach the target value (Step S13). The header pressure of the fuel gas is more accurately controlled by performing the feedback control, and thus, it is possible to further stabilize the supply of the fuel gas. This processing is processing of the PC 13 included in the FB control signal generation unit 32. The FB control signal generation unit 32 outputs the generated second control signal to the operation end control unit 33.

Subsequently, the operation end control unit 33 adds up the first control signal acquired from the FF control signal generation unit 31 and the second control signal acquired from the FB control signal generation unit 32, and calculates an operation amount with respect to some compressors 2 of the plurality of compressors 2. This is processing performed by the adder 14A included in the operation end control unit 33. Moreover, the operation end control unit 33 sets the first signal acquired from the FF control signal generation unit 31 as the operation amounts of the remaining compressors 2. This is processing performed by the adder 14B included in the operation end control unit 33. If the operation end control unit 33 calculates the operation amount with respect to each compressor 2, the operation end control unit 33 outputs the operation amount with respect to each operation end, and controls the supply amount of the fuel gas from the each compressor 2 (Step S14). For example, the operation end control unit 33 obtains the IGV opening degree corresponding to the operation amount with reference to the correspondence table stored in the storage unit 34 between the operation amount and the IGV opening degree, and controls the opening degree of the IGV 5 by the obtained value. This is processing performed by the function generator 15 included in the operation end control unit 33. In addition, for example, the operation end control unit 33 obtains the ASV opening degree (ASV opening degree 1) corresponding to the operation amount with reference to the correspondence table stored in the storage unit 34 between the operation amount and the ASV opening degree. This is processing performed by the function generator 16 included in the operation end control unit 33. In addition, for example, the operation end control unit 33 obtains another ASV opening degree (ASV opening degree 2) from the target value of the flow rate of the fuel gas and the measured value of the flow rate of the fuel gas on the downstream side of the compressor 2. This is processing performed by the FC 17 included in the operation end control unit 33. In addition, the operation end control unit 33 selects a larger value of the ASV opening degree 1 and the ASV opening degree 2, and controls the ASV 6 by the selected ASV opening degree.

According to the present embodiment, in the load running system 1 including a plurality of compressors, using the preceding signal (first control signal) corresponding to the gas turbine load, or using the value obtained by adding up the preceding signal and the feedback control signal (second control signal) based on the fuel gas header pressure, it is possible to determine effective load distribution with respect to each compressor 2 for supplying the fuel gas according to the load of the gas turbine 3 regardless of the number of the gas turbines 3 or the compressors 2.

Second Embodiment

Hereinafter, a compressor control device 30 according to a second embodiment of the present invention is described with reference to FIG. 5.

In the second embodiment, the plurality of compressors 2 are controlled by one compressor control device 30 described in FIG. 1 of the first embodiment, and the second embodiment is different from the first embodiment in that the PC 13 outputs the second control signal generated by the feedback control to the operation end of each compressor 2.

Figure 5:
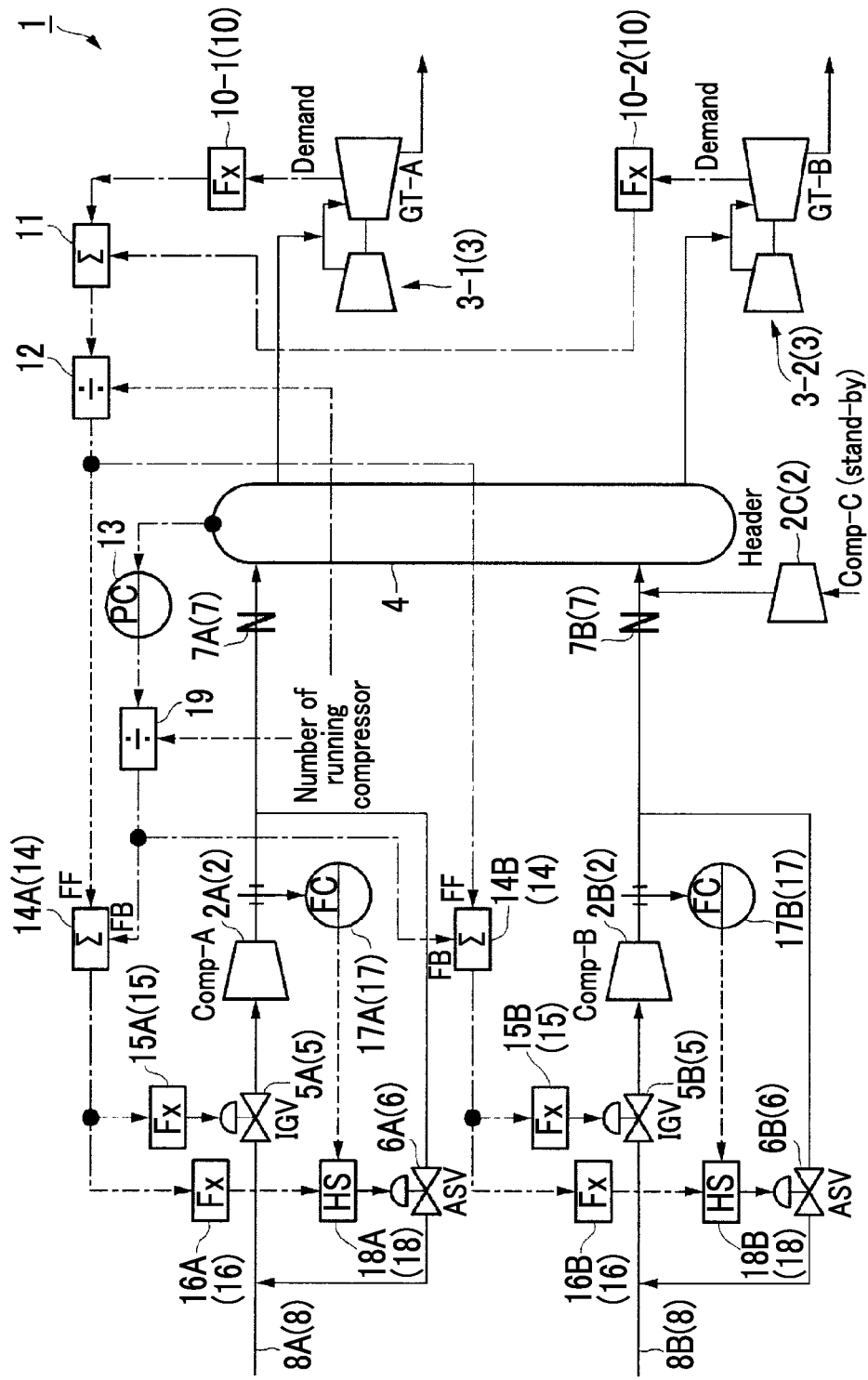
FIG. 5 is a diagram showing an example of a configuration of a load running system in a second embodiment of the present invention.

FIG. 5 is a diagram showing an example of a configuration of a load running system in the second embodiment of the present invention.

As shown in FIG. 5, in the load running system 1 of the present embodiment, a divider 19 is provided in the rear stage of the PC 13. The divider 19 divides the correction amount of the operation value calculated by the PC 13 by the number of the currently running compressors 2. The divider 19 outputs the divided correction amount to the adder 14. Other configurations are similar to those of the first embodiment.

The FB control signal generation unit 32 in the present embodiment includes the PC 13 and the divider 19. That is, the FB control signal generation unit 32 performs the feedback control on the basis of the deviation between the target value of the fuel gas header pressure and the measured value of the header pressure to generate the feedback control signal, and generates the second control signal which is obtained by dividing the value (correction amount) of the feedback control signal by the number of the running compressors 2. For example, in the case where 0% of the value of the feedback control signal is a neutral point, the second control signal is generated, which has the calculation value of "the value of feedback control signal÷the number of running compressors" as the value. In addition, in the case where 50% of the value of the feedback control signal is the neutral point, the second control signal is generated, which has the calculation value of "(the value of feedback control signal−50%)÷the number of running compressors+50%" as the value.

A processing flow of the present embodiment is described. In the present embodiment, in Step 13 of FIG. 4, the second control signal is generated considering the number of the running compressors 2. That is, the FB control signal generation unit 32 divides the value of the feedback control signal which is obtained by the result of the feedback control on the basis of the deviation between the target value and the measured value of the fuel gas header pressure by the number of the currently running compressors 2. For example, the number of the running compressors 2 is obtained from the FF control signal generation unit 31. The FB control signal generation unit generates the second control signal corresponding to the value of the feedback control signal obtained by the division. Other processing steps are similar to the processing flow of the first embodiment described in FIG. 4.

According to the present embodiment, it is possible more accurately control the fuel gas header pressure. For example, the value (correction amount) of the feedback control signal is set to 10%. At this time, in the method of the first embodiment, the opening degree control of the IGV 5 or the ASV 6 of 10% is performed on each of the compressors 2A and 2B. Accordingly, 10% of the flow rate of the fuel gas discharged from each of the compressors 2A and 2B is corrected, and totally, influences of 20% are generated, and there is a concern that excessive response may occur. According to the method of the present embodiment, since the control of the operation end (IGV 5 or the like) of each of the compressors 2A and 2B is performed by the value (5%) which is obtained by dividing the correction amount (10%) by the running number (two), the response of total 10% is obtained, and it is possible to rapidly converge on the target value of the fuel gas header pressure. In addition, for example, even when the number of the running compressors 2 is changed, since it is possible to regulate the operation value with respect to the operation end according to the running number before and after the change, it is possible to decrease variation in the fuel gas header pressure.

Third Embodiment

Hereinafter, a compressor control device 30 according to a third embodiment of the present invention is described with reference to FIGS. 6 to 9.

The third embodiment is an embodiment with respect to the load control of the compressor 2 in a situation in which outflow of the gas from the fuel gas header is not generated before the gas turbine 3 starts or when the gas turbine stops. Moreover, in the present embodiment, the feedback control is applied to all the compressors 2.

Figure 6:
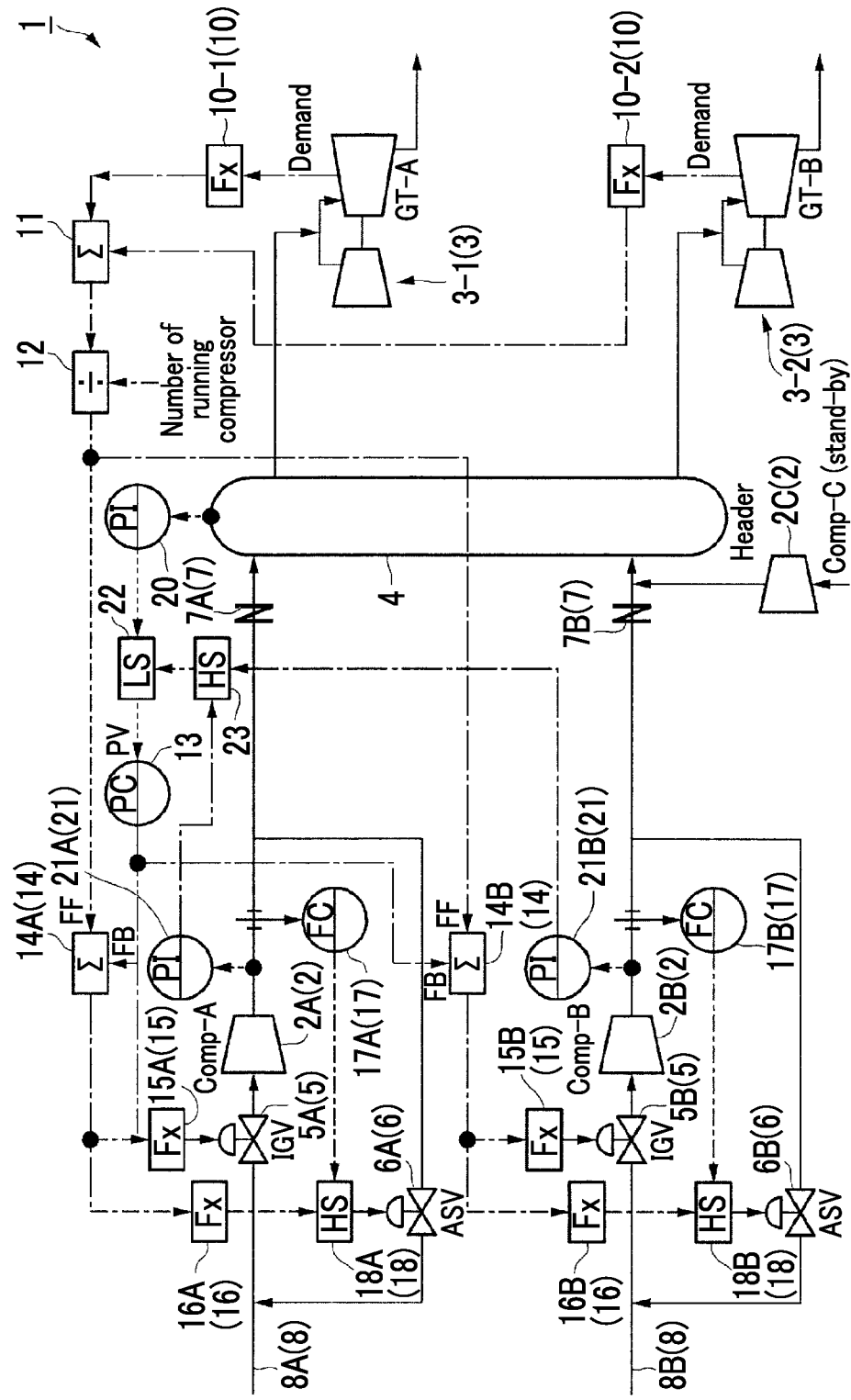
FIG. 6 is a diagram showing an example of a configuration of a load running system in a third embodiment of the present invention.

FIG. 6 is a diagram showing an example of the configuration of the load running system in the third embodiment of the present invention. As shown in FIG. 6, in the load running system 1 according to the present embodiment, a pressure gauge 21A is provided on the downstream side of the compressor 2A, and a pressure gauge 21B is provided on the downstream side of the compressor 2B. The pressure gauge 21A and the pressure gauge 21B are connected to the high-level selector 23. In addition, similarly to the first and second embodiments, the pressure gauge 20 is provided in the fuel gas header 4. The high-level selector 23 and the pressure gauge 20 are connected to a low-level selector 22 which is provided in the front stage of the PC 13.

The pressure gauge 21A measures the discharge pressure of the compressor 2A, and outputs the measured value to the high-level selector 23. The pressure gauge 21B measures the discharge pressure of the compressor 2B and outputs the measured value to the high-level selector 23.

The high-level selector 23 selects a larger measure value of the obtained measured values of the discharge pressures, and outputs the selected value to the low-level selector 22.

The pressure gauge 20 measures the fuel gas header pressure, and outputs the measured header pressure to the low-level selector 22.

The low-level selector 22 compares the obtained discharge pressure of the compressor 2 with the header pressure, and outputs the smaller pressure measured value to the PC 13. This value is referred to as a process value. The process value can be represented by the following expression.

Process Value=min {fuel gas header pressure, max {discharge pressure of compressor 2*A*, discharge pressure of compressor 2*B*, . . . }}

The PC 13 performs the feedback control such that deviation between the process value obtained from the low-level selector 22 and the target value of the fuel gas header pressure decreases. That is, in the present embodiment, even when the discharge pressure of the compressor 2 is selected as the process value, the control is performed such that the discharge pressure of the compressor 2 approaches the target value of the fuel gas header pressure.

Figure 7:
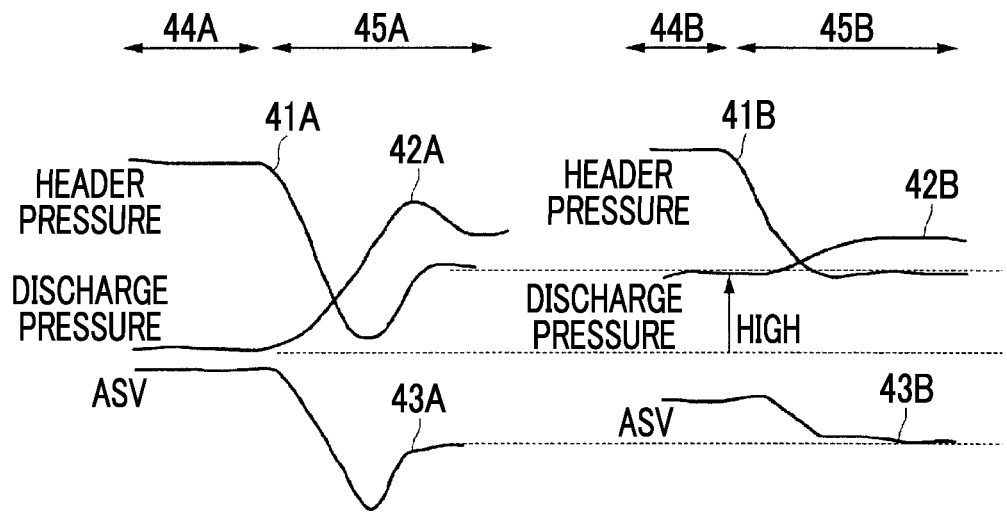
FIG. 7 is a diagram showing an example of a relationship between a discharge pressure of a compressor and a fuel gas header pressure in the third embodiment of the present invention.

FIG. 7 is a diagram showing an example of a relationship between the discharge pressure of the compressor and the fuel gas header pressure in the third embodiment of the present invention. First, a problem in a case where the present embodiment is not used is described with reference to the left diagram of FIG. 7.

The left diagram of FIG. 7 is a diagram showing an example of the relationship between the discharge pressure of the compressor and the fuel gas header pressure in the related art.

In the left diagram of FIG. 7, a reference numeral 41A indicates the change in the fuel gas header pressure. A reference numeral 42A indicates the change in the discharge pressure of the compressor 2. In addition, a reference numeral 43A indicates the change in the opening degree of the ASV 6 when the fuel gas header pressure and the discharge pressure of the compressor 2 have the relationships shown by the reference numerals 41A and 42A. If the fuel gas header pressure increases, the control is performed by the pressure control which constantly maintains the fuel gas header pressure such that the ASV 6 is open and the IGV 5 is closed. A reference numeral 44A indicates a period during when the gas turbine 3 stops. In a situation in which the gas turbine 3 stops, since it is not necessary to supply the fuel gas, the discharge pressure of the compressor 2 decreases. However, since outflow of the fuel gas from the fuel gas header 4 is not generated, the fuel gas header pressure increases (for example, 42 atmosphere), and thus, the ASV 6 is fully open, and the IGV 5 is fully closed.

The gas turbine 3 starts after the period 44A, and a reference numeral 45A indicates a period while the gas turbine 3 is run. If the gas turbine 3 starts, the fuel gas flows out from the fuel gas header 4, and the fuel gas pressure temporarily decreases. However, the fuel gas header pressure is controlled so as to be converged to a predetermined target value (for example, 40 atmosphere). In addition, the discharge pressure of the compressor 2 increases according to the start of the gas turbine 3, and the discharge pressure is converged to a predetermined value. In addition, the ASV 6 is controlled so as to be gradually closed (for example, approximately 10% to 20%) from the fully open state, and the IGV 5 is controlled so as to be gradually open.

According to the control method of the related art, in a case where the gas turbine 3 starts from the stopping state, the control which adjusts the opening degrees of the IGV 5 and the ASV 6 should be started from the fully closed state of the IGV 5 and the fully open state of the ASV 6. Accordingly, time is required until the fuel gas header pressure becomes the target value, and there is a problem that variation in the fuel gas header pressure increases until the fuel gas header pressure is statically determined.

Next, a solution of the present embodiment with respect to the above-described problem is described with reference to the right diagram of FIG. 7.

The right diagram of FIG. 7 is a diagram showing an example of the relationship between the discharge pressure of the compressor and the fuel gas header pressure in the third embodiment of the present invention.

A reference numeral 41B indicates the change in the fuel gas header pressure, a reference numeral 42B indicates the change in the discharge pressure of the compressor 2, and a reference numeral 43B indicates the change in the ASV opening degree. A reference numeral 44B indicates a stop period of the gas turbine, and a reference numeral 45B indicates a running period of the gas turbine.

In the related art, the feedback control is always performed based on the fuel gas header pressure. However, in the present embodiment, the fuel gas header pressure and the discharge pressure of the compressor are compared with each other, and the feedback control is performed using the smaller value thereof. In general, when the gas turbine 3 starts, the discharge pressure of the compressor 2 is greater than the fuel gas header pressure. On the other hand, when the gas turbine 3 stops, the fuel gas header pressure is greater than the discharge pressure of the compressor 2. Therefore, according to the present embodiment, the control becomes the opening degree controls of the IGV 5 and the ASV 6 based on the fuel gas header pressure during the running of the gas turbine, and the control is automatically switched to the opening degree controls of the IGV 5 and the ASV 6 based on the discharge pressure of the compressor during the stop of the gas turbine.

As described above, in the present embodiment, in the state where the gas turbine stops, the control is switched to the feedback control on the basis of the discharge pressure of the compressor 2. In addition, at this time, the target value of the discharge pressure is a target value of the fuel gas header pressure. Accordingly, in order to allow the discharge pressure of the compressor 2 which easily decreases to approach the target value of the fuel gas header pressure, the opening degree of the ASV 6 is not fully open, and even when the gas turbine 3 stops, it is possible to cause the discharge pressure of the compressor 2 to approach the fuel gas header pressure. Therefore, when the gas turbine 3 starts, it is possible to start the control from the state where the opening degree of the ASV 6 is reduced. In addition, it is possible to start the control from a state where the discharge pressure of the compressor 2 approaches the value of the discharge pressure which is statically determined when the gas turbine runs. According to this method, the time until the pressure is statically determined is shortened, and it is possible to decrease variation in the fuel gas header pressure.

In addition, FIG. 6 exemplifies the configuration in which the control with respect to the number of the plurality of compressors 2 is performed by one compressor control device 30. However, the compressor control device 30 may be provided on each compressor 2. In this case, each compressor control device 30 includes at least the low-level selector 22 of the low-level selector 22 and the high-level selector 23. The low-level selector 22 acquires the measured values from the pressure gauge 21 which is controlled by the device and is provided on the downstream side of the compressor 2, and the pressure gauge 20 which is provided in the fuel gas header 4, selects the smaller value thereof, and outputs the selected value to the PC 13 as the process value. In this configuration, the process value can be represented by the following Expression.

The process value=min {fuel gas header pressure, discharge pressure of compressor 2 controlled by the device}

The PC 13 included in the FB control signal generation unit 32 performs the feedback control using the process value.

Figure 8:
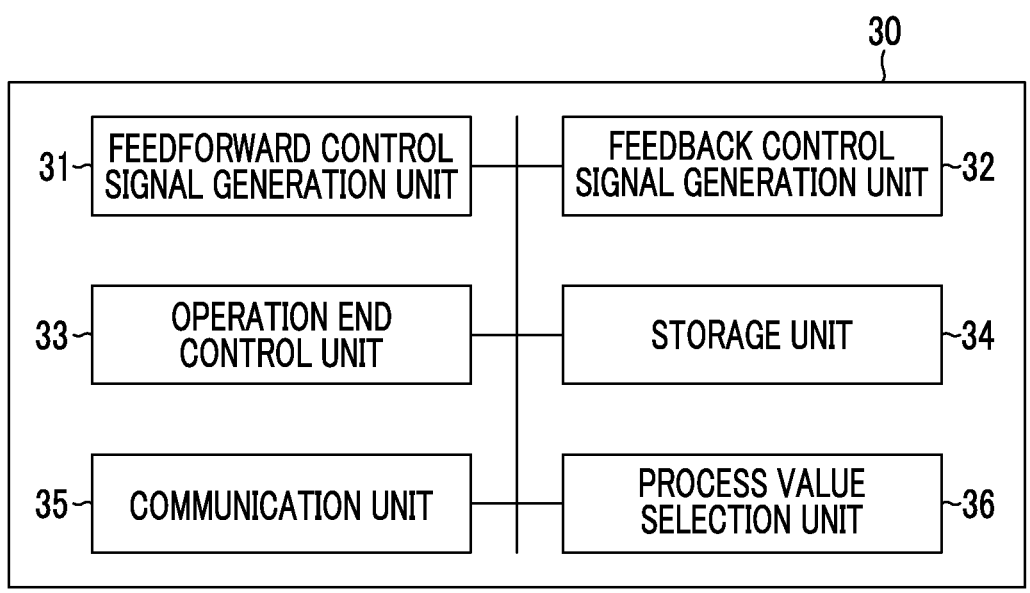
FIG. 8 is a block diagram showing an example of a compressor control device in the third embodiment of the present invention.

FIG. 8 is a block diagram showing an example of the compressor control device in the third embodiment of the present invention. The configuration of the compressor control device 30 is described with reference to FIG. 8.

The compressor control device 30 of the present embodiment includes a process value selection unit 36. In addition, the FB control signal generation unit 32 acquires the process value which is selected by the process value selection unit 36, and performs the feedback control on the basis of the process value to generate the second control signal. Other configurations are similar to those of the first embodiment.

The process value selection unit 36 acquires the measured value of the discharge pressure of the compressor 2 and the fuel gas header pressure, compares the maximum value of the discharge pressures with the fuel gas header pressure, and selects the smaller value thereof. The process value selection unit 36 outputs the selected value to the FB control signal generation unit 32 as the process value. In the example of FIG. 6, the process value selection unit 36 includes the low-level selector 22 and the high-level selector 23.

A flow of the processing of the present embodiment is described with reference to FIG. 9.

Figure 9:
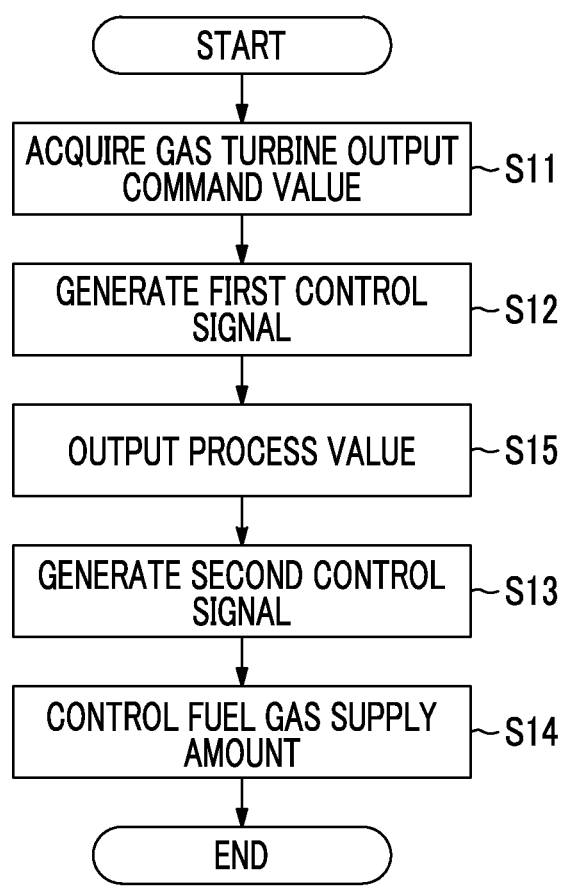
FIG. 9 is a flow chart of a load control processing of the compressor in the third embodiment of the present invention.

FIG. 9 is a flow chart of a load control processing of the compressor in the third embodiment of the present invention.

The processing of Steps S11 and S12 is similar to that of the first embodiment. That is, the FF control signal generation unit 31 acquires the preceding signal of the gas turbine load to generate the first control signal.

In parallel with Steps S11 and S12, the process value selection unit 36 acquires the measured value of the discharge pressure of each compressor 2 which is the object to be controlled by the compressor control device 30 and the measured value of the fuel gas header pressure. The process value selection unit 36 selects the maximum value of the acquired discharge pressures, compares the selected maximum value of the discharge pressures with the fuel gas header pressure, and selects the smaller value thereof. In addition, in a case where the number of the compressors 2 which are objects to be controlled by the compressor control device 30 is one, the process value selection unit 36 compares the measured value of the discharge pressure of the one compressor 2 and the fuel gas header pressure, and selects the smaller value thereof. The process value selection unit 36 outputs the selected value to the FB control signal generation unit 32 as the process value (Step S15). As described above, when the gas turbine runs, the discharge pressure of the compressor is greater than the fuel gas header pressure, and when the gas turbine stops, the fuel gas header pressure is greater than the discharge pressure of the compressor. Accordingly, when the gas turbine runs, the fuel gas header pressure becomes the process value, and when the gas turbine stops, the discharge pressure of the compressor becomes the process value.

The processing of Steps S13 and S14 after Steps S11 and S12 is similar that of the first embodiment. That is, the FB control signal generation unit 32 performs the feedback control on the basis of the process value to generate the second control signal. In addition, the operation end control unit 33 controls the supply amount of the fuel gas discharged from the compressor 2 on the basis of the first control signal and the second control signal.

According to the present embodiment, when the outflow of the fuel gas from the fuel gas header is not generated before the gas turbine 3 starts or when the gas turbine 3 stops, the control can be automatically switched from the control of the fuel gas header pressure to the control of the discharge pressure of the compressor 2, and it is possible to improve the pressure control of the fuel gas header.

Fourth Embodiment

Hereinafter, a compressor control device 30 according to a fourth embodiment of the present invention is described with reference to FIGS. 10 and 11.

Figure 10:
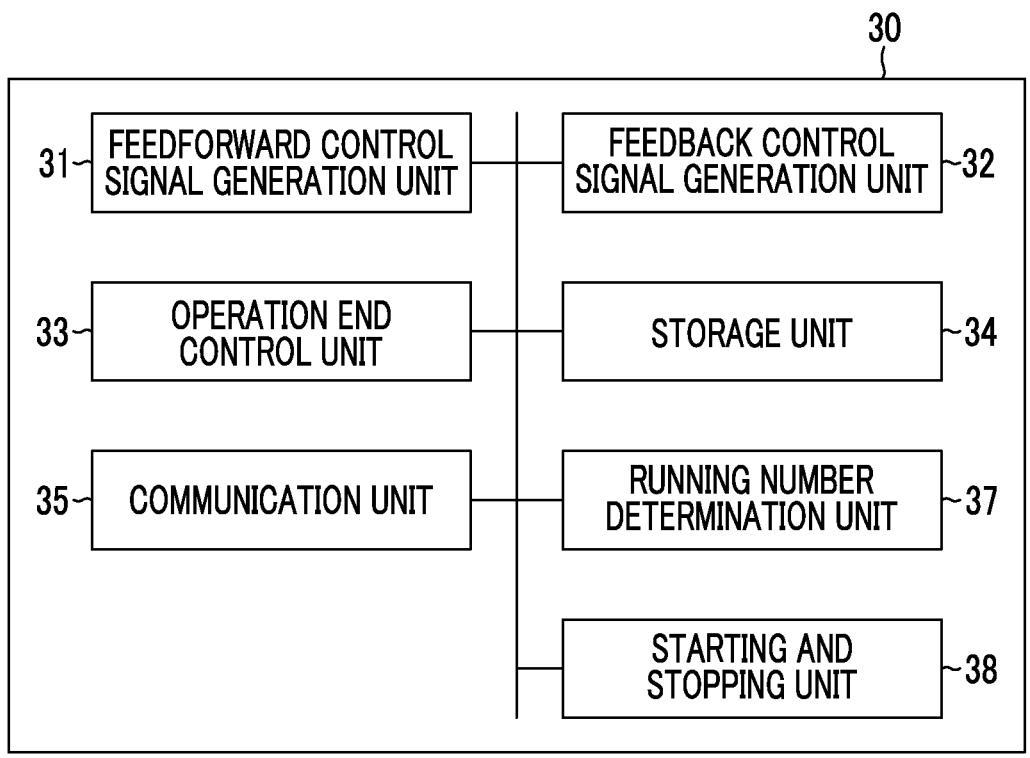
FIG. 10 is a block diagram showing an example of a compressor control device in a fourth embodiment of the present invention.

FIG. 10 is a block diagram showing an example of the compressor control device according to the fourth embodiment of the present invention. The present embodiment may be combined with any one of the first to third embodiments. FIG. 10 shows a configuration in a case where the present embodiment is combined with the first embodiment.

As shown in FIG. 10, the present embodiment is different from the first embodiment in that the compressor control device 30 includes a running number determination unit 37 and a starting and stopping unit 38. Other configurations are similar to those of the second embodiment.

The running number determination unit 37 acquires the preceding signal of the gas turbine load via the communication unit 35 from the output control device of the gas turbine or the like, and determines the running number of the compressors 2 according to the total load of the gas turbine. In addition, in a case where the total load varies by as much as or by more than a predetermined range within a predetermined time such as a case where the gas turbine load abruptly varies or when the load is interrupted, the running number determination unit 37 does not change the number of the running compressors 2 until a predetermined time has elapsed after the variation.

The starting and stopping unit 38 starts and stops the compressor 2 based on the determination of the running number determination unit 37 such that the number of the running compressors 2 becomes the number of the compressors according to the total load of the gas turbine.

Figure 11:
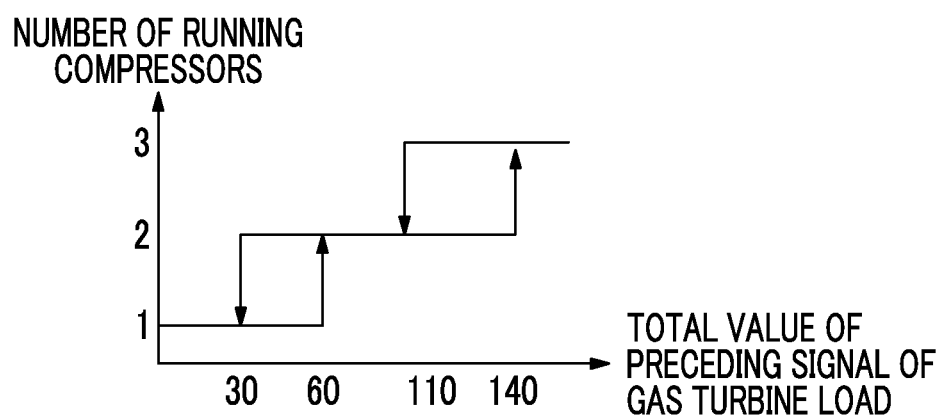
FIG. 11 is a diagram for explaining a control of the number of running compressors in the fourth embodiment of the present invention.

FIG. 11 is a diagram for explaining the control of the number of running compressors in the fourth embodiment of the present invention.

For example, FIG. 11 shows that one compressor runs currently, the running number increases to be two if the total value of the preceding signal of the gas turbine load reaches 60, and the running number increases to be three if the total value reaches 140. In addition, FIG. 11 shows that three compressors run currently, the running number decreases to be two if the total value of the preceding signal with respect to the gas turbine load decreases to 110, and the running number increases to be one if the total value decreases to be 30. Accordingly, for example, if the total value of the preceding signals of the gas turbine load is changed from 50 to 65, two starting and stopping units 38 start, and thereafter, even when the total value of the preceding signal decreases to be 45, the running number does not change. In addition, thereafter, if the total value of the preceding signal decreases to be 25, the starting and stopping unit 38 stops one compressor 2.

A correspondence table exemplified in FIG. 11 between the total value of the preceding signals of the gas turbine load and the running number or the like is recorded in the storage unit 34, and the running number determination unit 37 acquires the running number (set running number) according to the acquired total value of the preceding signals of the gas turbine load with reference to correspondence table. In addition, the running number determination unit 37 compares the currently running number and the acquired set running number. If the acquired set running number is greater than the currently running number, the running number determination unit 37 instructs the starting and stopping unit 38 to start new compressors 2 corresponding to the greater number. In addition, if the acquired set running number is smaller than the currently running number, the running number determination unit 37 instructs the starting and stopping unit 38 to stop the compressors 2 corresponding to the smaller number. For example, the starting and stopping unit 38 reads a starting order and a stopping order of the compressors 2 recorded in the storage unit 34, and starts and stops the compressors 2 according to the orders.

In addition, in order to stably operate the system, in a state where the load is excessive, the running number determination unit 37 does not change the number of the running compressors 2 until a predetermined time has elapsed after the acquired total value of the preceding signals is changed.

The present embodiment can be applied to not only the configuration in which the number of the plurality of compressors 2 is controlled by one compressor control device 30 to but also the configuration in which the compressor control device 30 is provided for each compressor 2. For example, each compressor control device 30 receives the preceding signal of the gas turbine load and obtains the running number according to the gas turbine load. In addition, in a state where the starting order of the compressors 2 are determined in advance, information of the starting order of the compressors 2 controlled by the compressor control device 30 is recorded in the storage unit 34 of each compressor control device 30. In addition, for example, the running number determined by the running number determination unit 37 of each compressor control device 30 is changed from one to two, the running number determination unit 37 included in the compressor control device 30 in which the staring order recorded in the storage unit 34 of the device is two instructs the starting and stopping unit 38 to start the compressor 2, and the compressors start.

According to the present embodiment, by automatically starting and stopping the compressor 2, it is possible to allow the circulation flow rate of the compressor to be appropriate, and it is possible to increase energy efficiency. The control of the present embodiment with respect to the number of the compressors is a control of the number based on the preceding signal of the gas turbine load, variations further decreases compared to a case where the number is determined on the basis of the measured value of various state quantities such as pressure, and stable starting and stopping can be determined. In addition, since the starting and stopping are controlled on the basis of the running number corresponding to the load of the gas turbine, it is possible to largely change the gas turbine load without considering influences due to the additional starting and stopping of the compressors 2.

Moreover, the components of the above-described embodiments may be appropriately replaced by the known components within a scope which does not depart from the gist of the present invention. In addition, the technical scope of the present invention is not limited to the above-described embodiments, and various modifications may be added to the scope which does not depart from the gist of the present invention. For example, the supply amount of the fuel gas may be controlled by adjusting the opening degree of any one of the IGV 5 and the ASV 6 to control the fuel gas header pressure. In addition, the IGV 5 is an example of the flow rate regulation valve, and the ASV 6 is an example of the recycle valve. The operation end control unit 33 is an example of the control unit.

INDUSTRIAL APPLICABILITY

According to the above-described compressor control device, compressor control system, and compressor control method, in the system in which the plurality of gas turbines and the plurality of fuel gas compressors are provided, it is possible to assign a load to compressors regardless of the numbers of the gas turbines and compressors.

REFERENCE SIGNS LIST

1: load running system
2: compressor
3: gas turbine
4: fuel gas header
5: IGV
6: ASV
7: check valve
8: fuel gas supply line
10-1, 10-2, 10-3, 10-4, 15, 16: function generator
11, 14: adder
12, 19: divider
13: PC
17: FC
18, 23: high-level selector
20, 21: pressure gauge
22: low-level selector
30: compressor control device
31: feedforward control signal generation unit
32: feedback control signal generation unit
33: operation end control unit
34: storage unit
35: communication unit
36: process value selection unit
37: running number determination unit
38: starting and stopping unit

The invention claimed is:
1. A load running system comprising:
a plurality of compressors which compress a fuel gas and supply the compressed fuel gas to a load apparatus,
a compressor control device comprising:
a feedforward control signal generation unit which is configured to generate a first control signal which controls an amount of the fuel gas supplied by the compressors, on the basis of a value which is obtained by dividing a total load of the load apparatus by a number of running compressors of the plurality of compressors;
a feedback control signal generation unit which is configured to perform a feedback control, on the basis of a deviation between a target value and a measured value of a header pressure of the fuel gas, and generate a second control signal; and
a control unit which is configured to control the amount of the fuel gas supplied by the plurality of compressors, on the basis of the first control signal or a value obtained by adding the second control signal to the first control signal;
wherein, the compressor control device is configured to control the supply amount of the fuel gas to some or all of the plurality of compressors among the plurality of compressors, on the basis of the value obtained by adding the second control signal to the first control signal, and the compressor control device is configured to control the supply amount of the fuel gas to the remaining compressors, on the basis of only the first control signal.

2. The load running system according to claim 1, wherein the feedback control signal generation unit is configured to generate a new second control signal which has a calculated value obtained by dividing the value of the generated second control signal by the number of running compressors of the plurality of compressors as a value.

3. The load running system according to claim 2, wherein the compressor control device further comprising:
a process value selection unit which is configured to acquire a measured value of a discharge pressure of at least one compressor and the measured value of the header pressure of the fuel gas, and select the smaller value of a maximum value of the measured values of the discharge pressure of the at least one compressor and the measured value of the header pressure of the fuel gas,
wherein the feedback control signal generation unit is configured to perform the feedback control, on the basis of a deviation between a target value of the header pressure and the value selected by the process value selection unit, and generate the second control signal.

4. The load running system according to claim 2,
wherein the control unit is configured to control the supply amount of the fuel gas by adjusting an opening degree of any one of a flow rate regulation valve which controls the amount of the fuel gas flowing into the plurality of compressors and a recycle valve for returning the fuel gas discharged from the plurality of compressors to the upstream sides of the plurality of compressors.

5. The load running system according to claim 2, wherein the compressor control device further comprising:
a running number determination unit which is configured to determine the number of running compressors of the plurality of compressors according to the total load of the load apparatus.

6. The load running system according to claim 1, wherein the compressor control device further comprising:
a process value selection unit which is configured to acquire a measured value of a discharge pressure of at least one compressor and the measured value of the header pressure of the fuel gas, and select the smaller value of a maximum value of the measured values of the discharge pressure of the at least one compressor and the measured value of the header pressure of the fuel gas,
wherein the feedback control signal generation unit is configured to perform the feedback control, on the basis of a deviation between a target value of the header pressure and the value selected by the process value selection unit, and generate the second control signal.

7. The load running system according to claim 6,
wherein the control unit is configured to control the supply amount of the fuel gas by adjusting an opening degree of any one of a flow rate regulation valve which controls the amount of the fuel gas flowing into the plurality of compressors and a recycle valve for returning the fuel gas discharged from the plurality of compressors to the upstream sides of the plurality of compressors.

8. The load running system according to claim 6, wherein the compressor control device further comprising:
a running number determination unit which is configured to determine the number of running compressors of the plurality of compressors according to the total load of the load apparatus.

9. The load running system according to claim 1,
wherein the control unit is configured to control the supply amount of the fuel gas by adjusting an opening degree of any one of a flow rate regulation valve which controls the amount of the fuel gas flowing into the plurality of compressors and a recycle valve for returning the fuel gas discharged from the plurality of compressors to the upstream sides of the plurality of compressors.

10. The load running system according to claim 9, wherein the compressor control device further comprising:
a running number determination unit which is configured to determine the number of running compressors of the plurality of compressors according to the total load of the load apparatus.

11. The load running system according to claim 1, wherein the compressor control device further comprising:
a running number determination unit which is configured to determine the number of running compressors of the plurality of compressors according to the total load of the load apparatus.

12. The load running system according to claim 11,
wherein, in a case where the total load of the load apparatus varies by as much as or by more than a predetermined range within a predetermined time, the running number determination unit is configured not to change the number of running compressors of the plurality of compressors until a predetermined time has elapsed after the variation.

13. The load running system according to claim 1,
wherein the compressor control device is provided to each of the plurality of compressors.

14. A method of controlling a compressor control device in a load running system including a plurality of compressors which compress a fuel gas and supply the compressed fuel gas to a load apparatus, comprising:
generating a first control signal which controls an amount of the fuel gas supplied by the plurality of compressors, on the basis of a value which is obtained by dividing a total load of the load apparatus by the number of running compressors of the plurality of compressors;
performing a feedback control, on the basis of a deviation between a target value and a measured value of a header pressure of the fuel gas, and generate a second control signal; and
controlling the supply amount of the fuel gas to some or all of the plurality of compressors among the plurality of compressors, on the basis of a value obtained by adding the second control signal to the first control signal, and controlling the supply amount of the fuel gas to the remaining compressors, on the basis of only the first control signal.

* * * * *